Feb. 2, 1937.　　　F. P. SWALLOW　　　2,069,288
MANUFACTURE OF SANITARY DRINKING CUPS
Filed Feb. 12, 1934　　　12 Sheets-Sheet 1

INVENTOR.
Francis P. Swallow.
BY Moses & Nolte
ATTORNEYS.

Feb. 2, 1937.  F. P. SWALLOW  2,069,288
MANUFACTURE OF SANITARY DRINKING CUPS
Filed Feb. 12, 1934    12 Sheets-Sheet 2
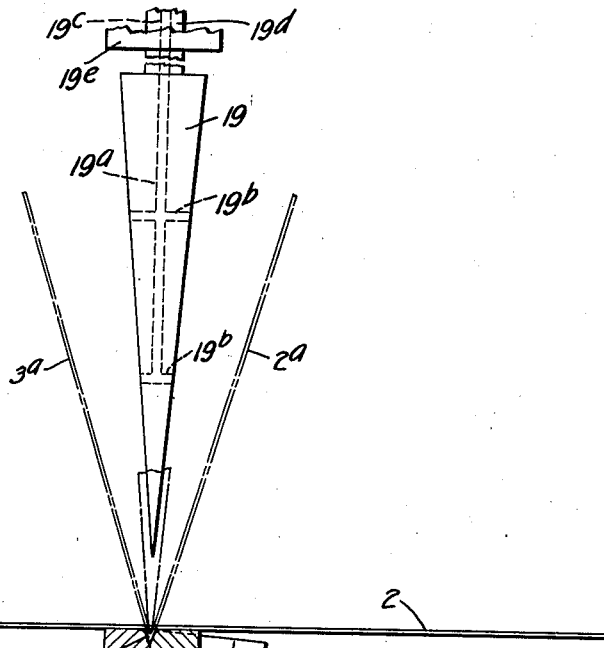
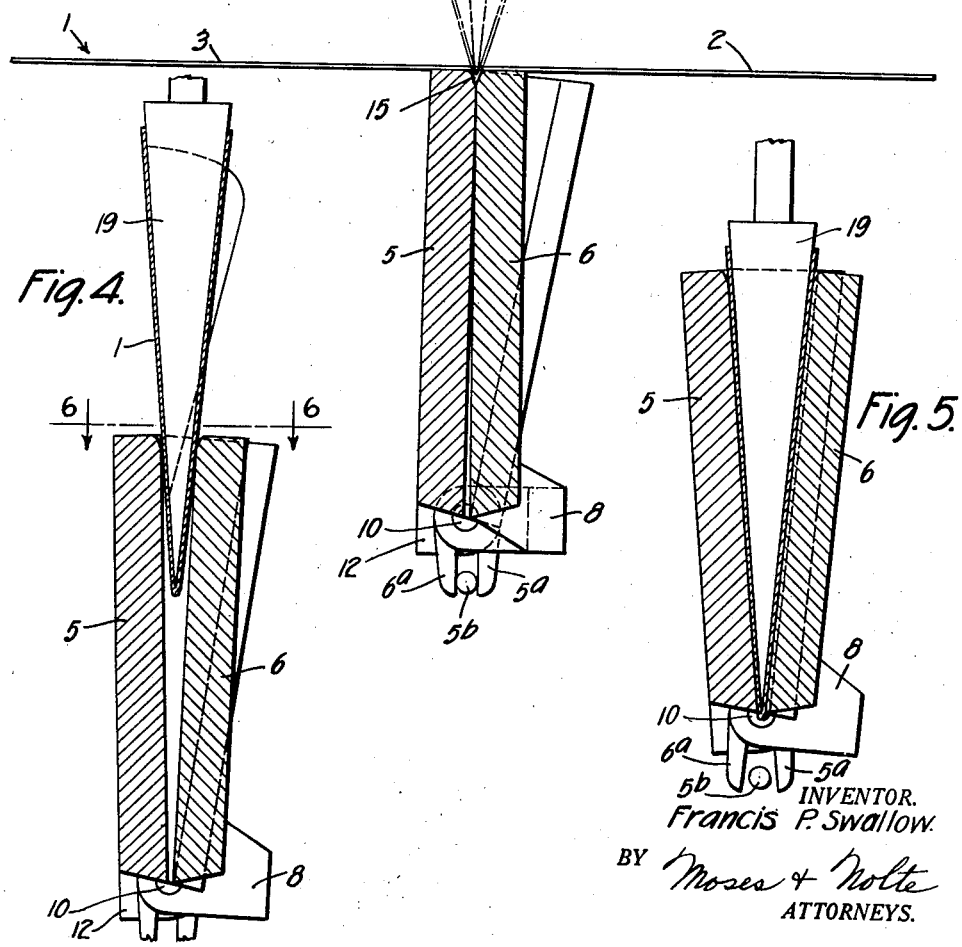
INVENTOR.
Francis P. Swallow.
BY Moses & Nolte
ATTORNEYS.

Feb. 2, 1937. F. P. SWALLOW 2,069,288
MANUFACTURE OF SANITARY DRINKING CUPS
Filed Feb. 12, 1934 12 Sheets-Sheet 3

INVENTOR.
Francis P. Swallow.
BY Moses & Nolte
ATTORNEYS.

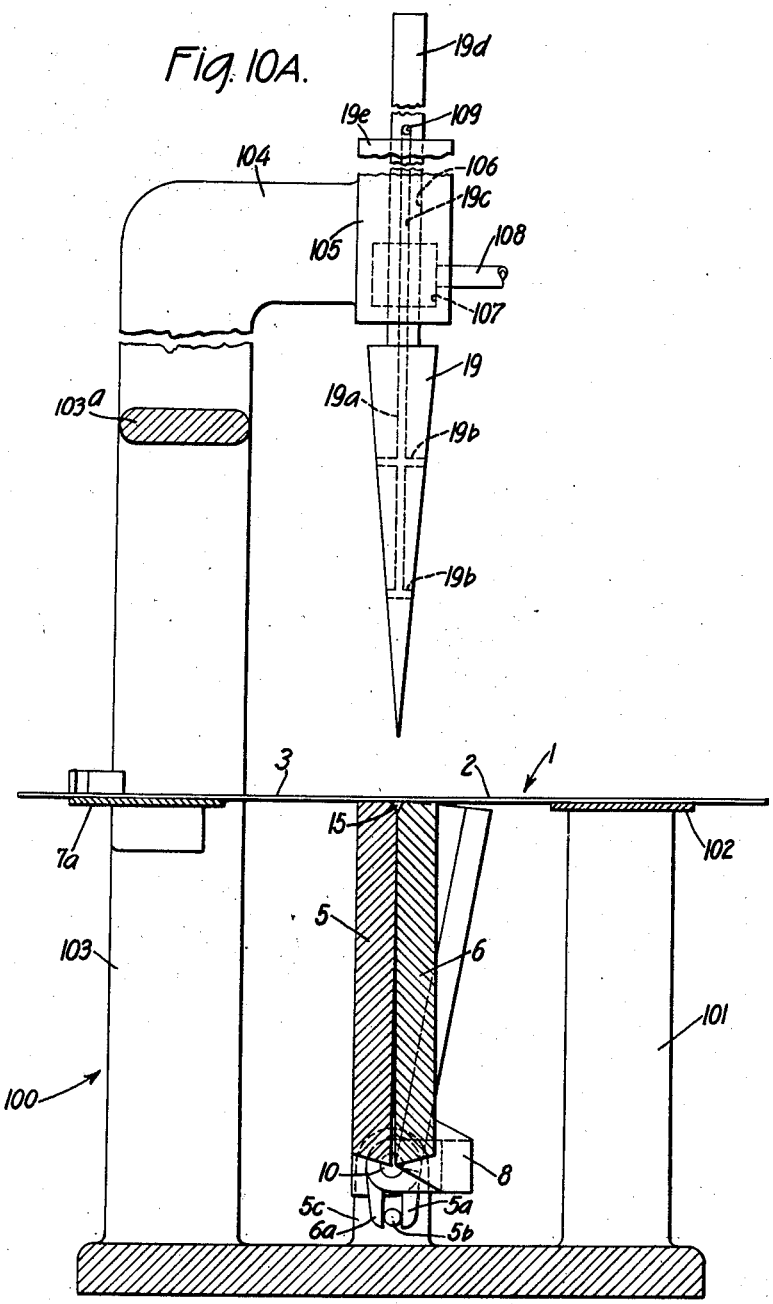

Feb. 2, 1937.   F. P. SWALLOW   2,069,288
MANUFACTURE OF SANITARY DRINKING CUPS
Filed Feb. 12, 1934   12 Sheets-Sheet 5
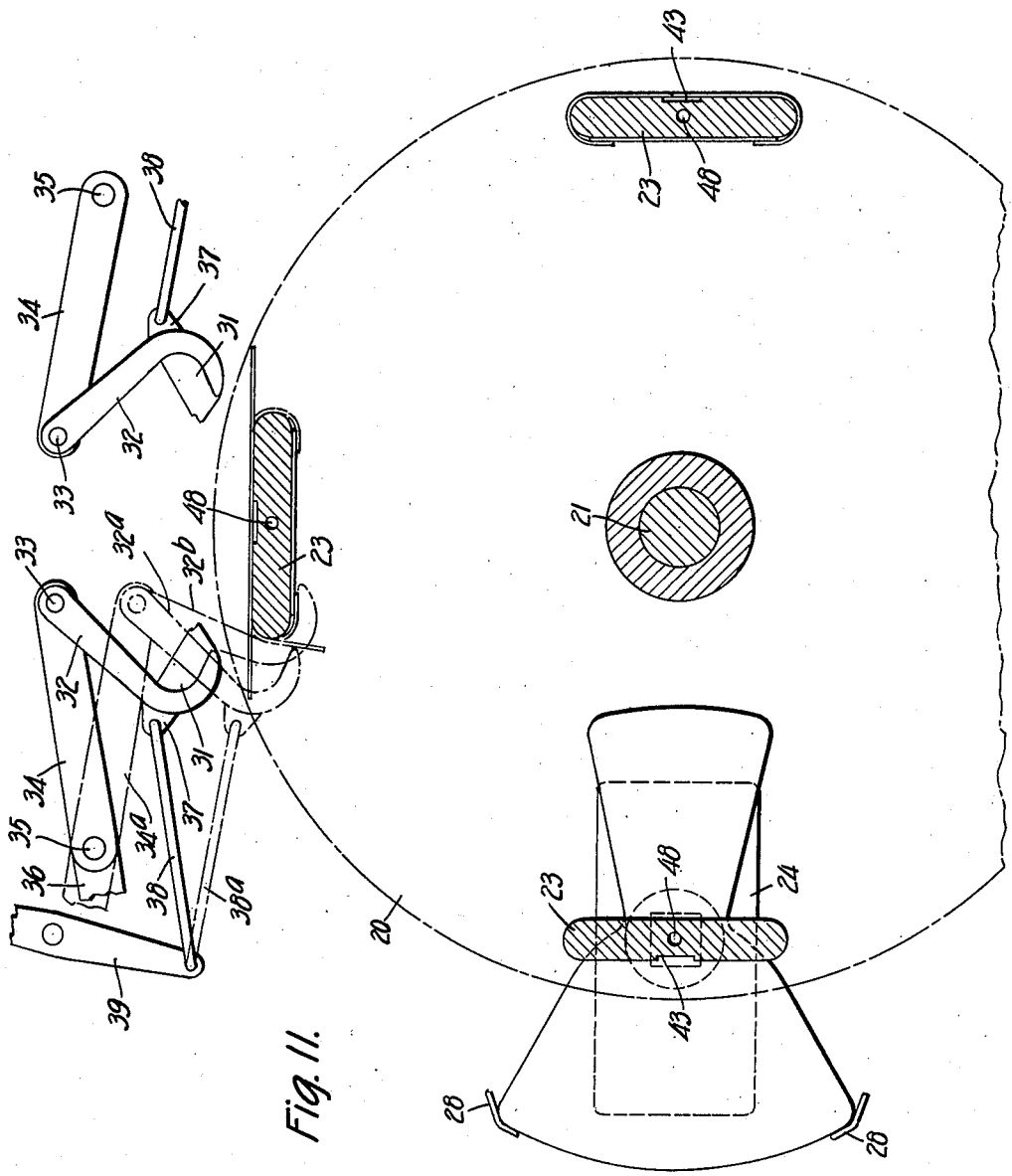
Fig. II.
INVENTOR.
Francis P. Swallow.
BY Moses & Nolte
ATTORNEYS.

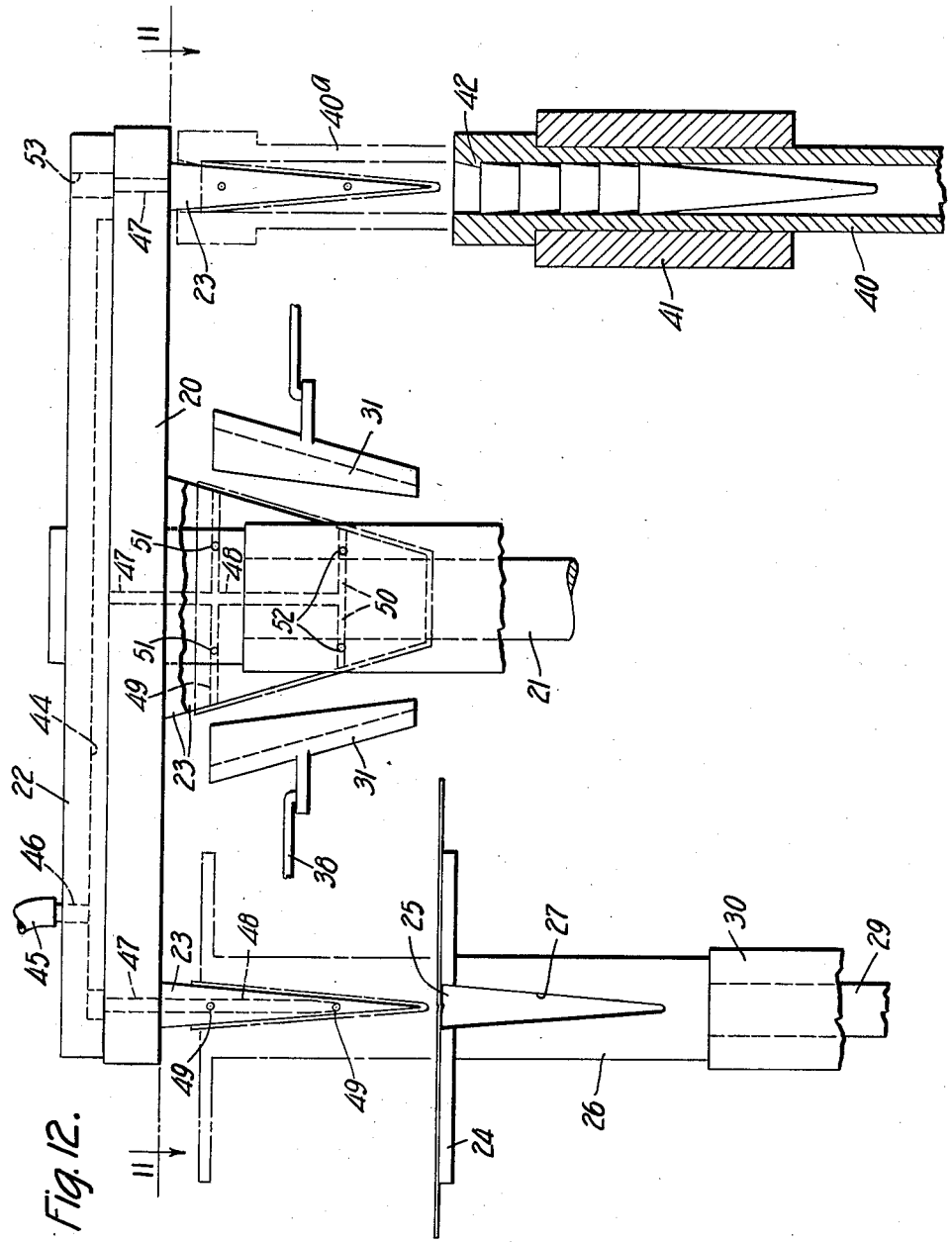

Feb. 2, 1937.  F. P. SWALLOW  2,069,288
MANUFACTURE OF SANITARY DRINKING CUPS
Filed Feb. 12, 1934  12 Sheets-Sheet 7

INVENTOR.
Francis P. Swallow.
BY Moser & Nolte
ATTORNEYS.

Feb. 2, 1937. F. P. SWALLOW 2,069,288
MANUFACTURE OF SANITARY DRINKING CUPS
Filed Feb. 12, 1934 12 Sheets-Sheet 8
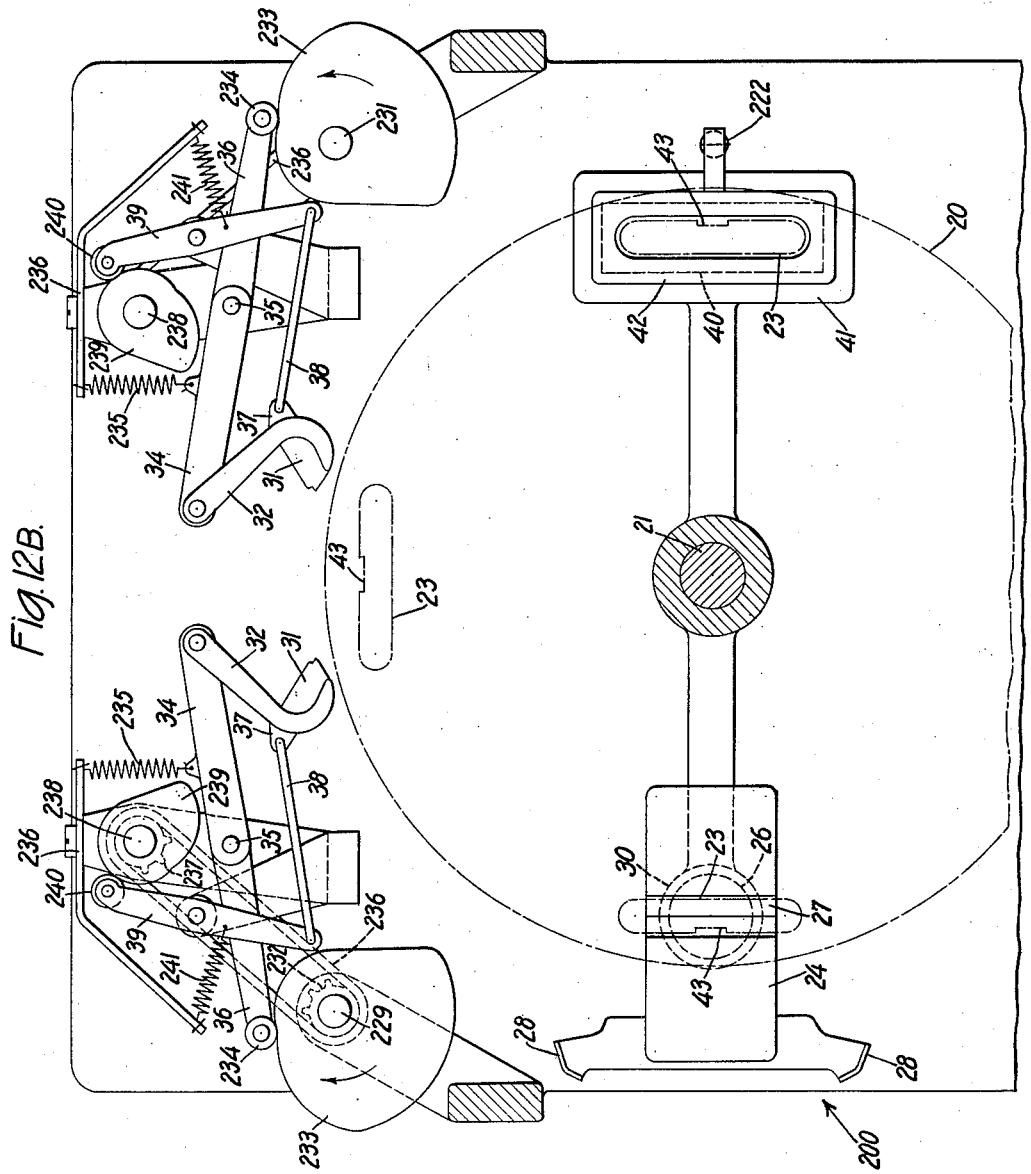
INVENTOR.
Francis P. Swallow.
BY Moses & Nolte
ATTORNEYS.

Feb. 2, 1937.  F. P. SWALLOW  2,069,288
MANUFACTURE OF SANITARY DRINKING CUPS
Filed Feb. 12, 1934   12 Sheets-Sheet 9

INVENTOR
Francis P. Swallow.
BY
ATTORNEYS

Feb. 2, 1937.  F. P. SWALLOW  2,069,288
MANUFACTURE OF SANITARY DRINKING CUPS
Filed Feb. 12, 1934  12 Sheets-Sheet 10

INVENTOR.
Francis P. Swallow.
BY Moses & Nolte
ATTORNEYS.

Feb. 2, 1937.  F. P. SWALLOW  2,069,288
MANUFACTURE OF SANITARY DRINKING CUPS
Filed Feb. 12, 1934   12 Sheets-Sheet 11
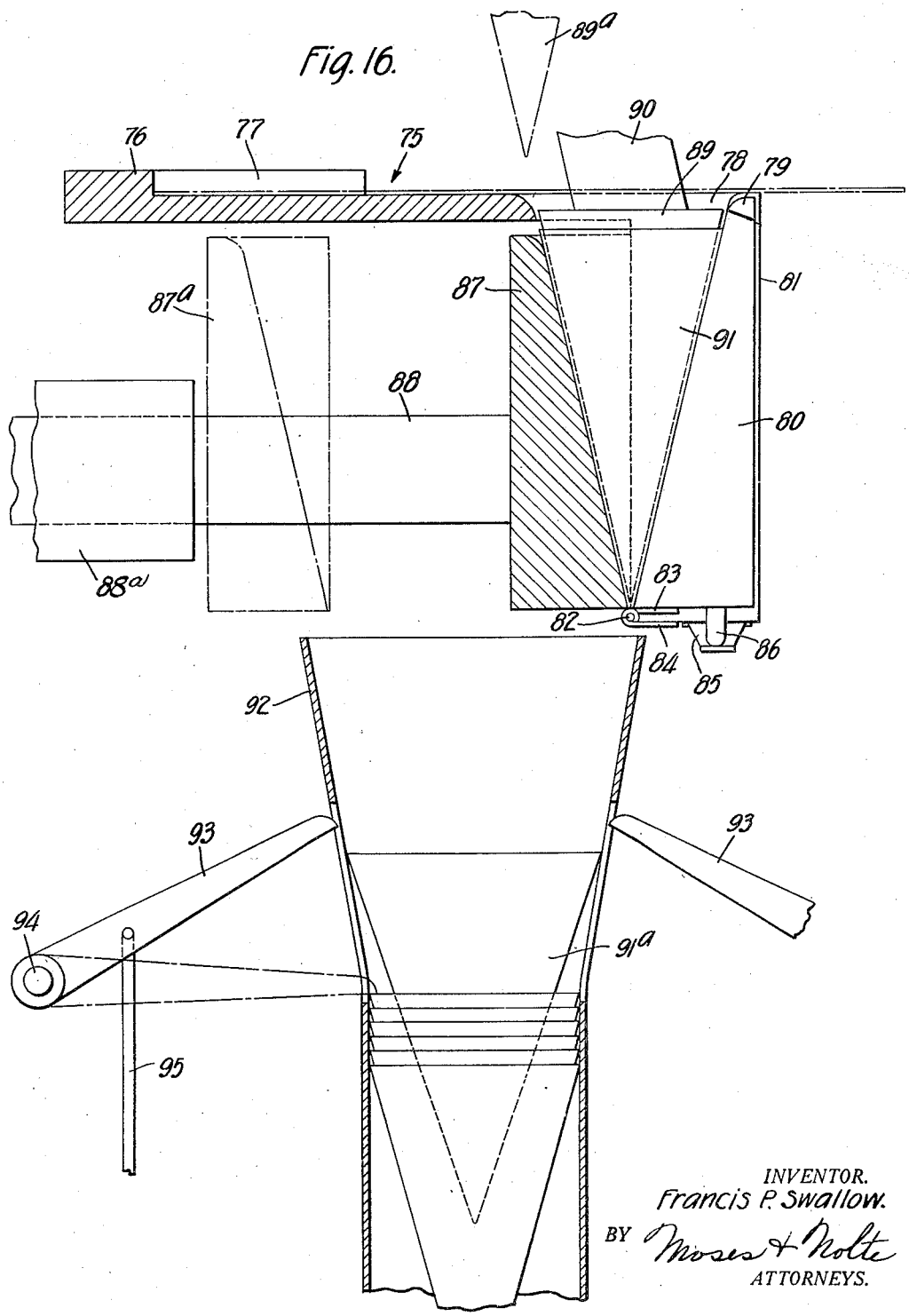
INVENTOR.
Francis P. Swallow.
BY Moses + Nolte
ATTORNEYS.

Feb. 2, 1937.　　　F. P. SWALLOW　　　2,069,288
MANUFACTURE OF SANITARY DRINKING CUPS
Filed Feb. 12, 1934　　12 Sheets-Sheet 12

INVENTOR.
Francis P. Swallow.
BY Moses & Nolte
ATTORNEYS.

Patented Feb. 2, 1937

2,069,288

UNITED STATES PATENT OFFICE 2,069,288

MANUFACTURE OF SANITARY DRINKING CUPS

Francis P. Swallow, Worcester, Mass., assignor to United States Envelope Company, Worcester, Mass., a corporation of Maine Application February 12, 1934, Serial No. 710,946

25 Claims. (Cl. 93—36.05)

This invention relates to the manufacture of sanitary drinking cups and is in the nature of an improvement upon the invention disclosed and claimed in my pending application, Serial No. 710,945, filed Feb. 12, 1934, for Manufacture of drinking cups.

It is an object of the present invention to provide a simple and economical mechanism for forming a blank of suitable sheet material, such as paper, into a finished cup.

It is a further object of the invention to provide a new and simplified method of forming the cup.

In accordance with the present invention, provision is desirably made of a pair of pivotally connected formers, one adapted to be received by the other and normally to fit against the base of the latter, and a wedge-shaped former adapted to be thrust against a blank and between said formers to insert the blank between them. One of the formers is desirably provided with curved recesses located outside the lateral bounds of the other former for progressively turning marginal portions of the wider sector of the blank into overlapping relation to the margins of the narrower sector of the blank, the arrangement being such that when the wedge-shaped former is thrust fully home between the separable formers, the overlapped margins of the blank sectors are pressed firmly together to form good adhesive unions. Thus the cup is fully formed from a flat blank at a single operation.

In accordance with another embodiment of the invention, provision is made of a revolving turret movable step by step, and of means for performing successive operations upon the blank at successive stations.

In accordance with this embodiment, a plurality of wedge-shaped male formers are provided upon the turret. At one station provision is made of a table adapted to receive a blank, said table having an opening therethrough and a wedge-shaped female former extending downward in register with said opening. The table is adapted to be thrust upward to fold the blank against opposite faces of the wedge-shaped male former, to which the blank is then held by suction or other convenient manner. The table with the female former is then retracted and the blank is carried to a side folding and seam forming station, in which folding and pressing plates are swung around the sides of the male former and pressed against it to cause marginal portions of the wider blank sector to be superposed upon and adhesively united to the longitudinal marginal portions of the narrower blank sector. When these folding and pressing plates have been retracted, the male former is carried to a discharge station. At this station a chute is thrust upward round the formed cup until a shoulder located near the top of the chute passes above the mouth of the cup. The chute is then retracted and is effective in such retractive movement to strip the formed cup from the male former and to add it to a stack of finished cups in the chute.

Other objects and advantages will hereinafter appear.

In the drawings forming part of this specification,

Fig. 3 is a fragmentary view in elevation and partly in section, of the same parts illustrated in Fig. 2, the male former being illustrated in full lines a short distance above the blank, and in dot and dash lines as having engaged the blank and partially folded the same;

Figs. 4 and 5 are views similar to Fig. 3 illustrating successive stages in the operation of the parts;

Figure 10:
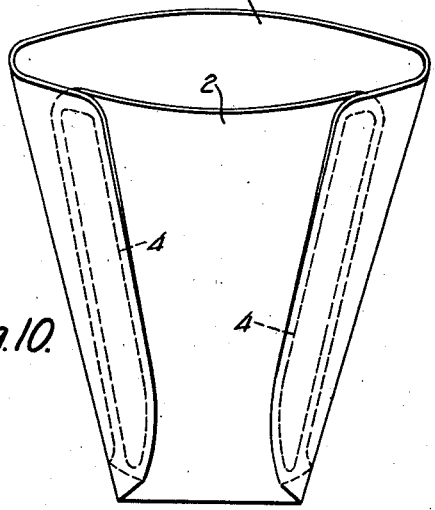
Figure 12A:
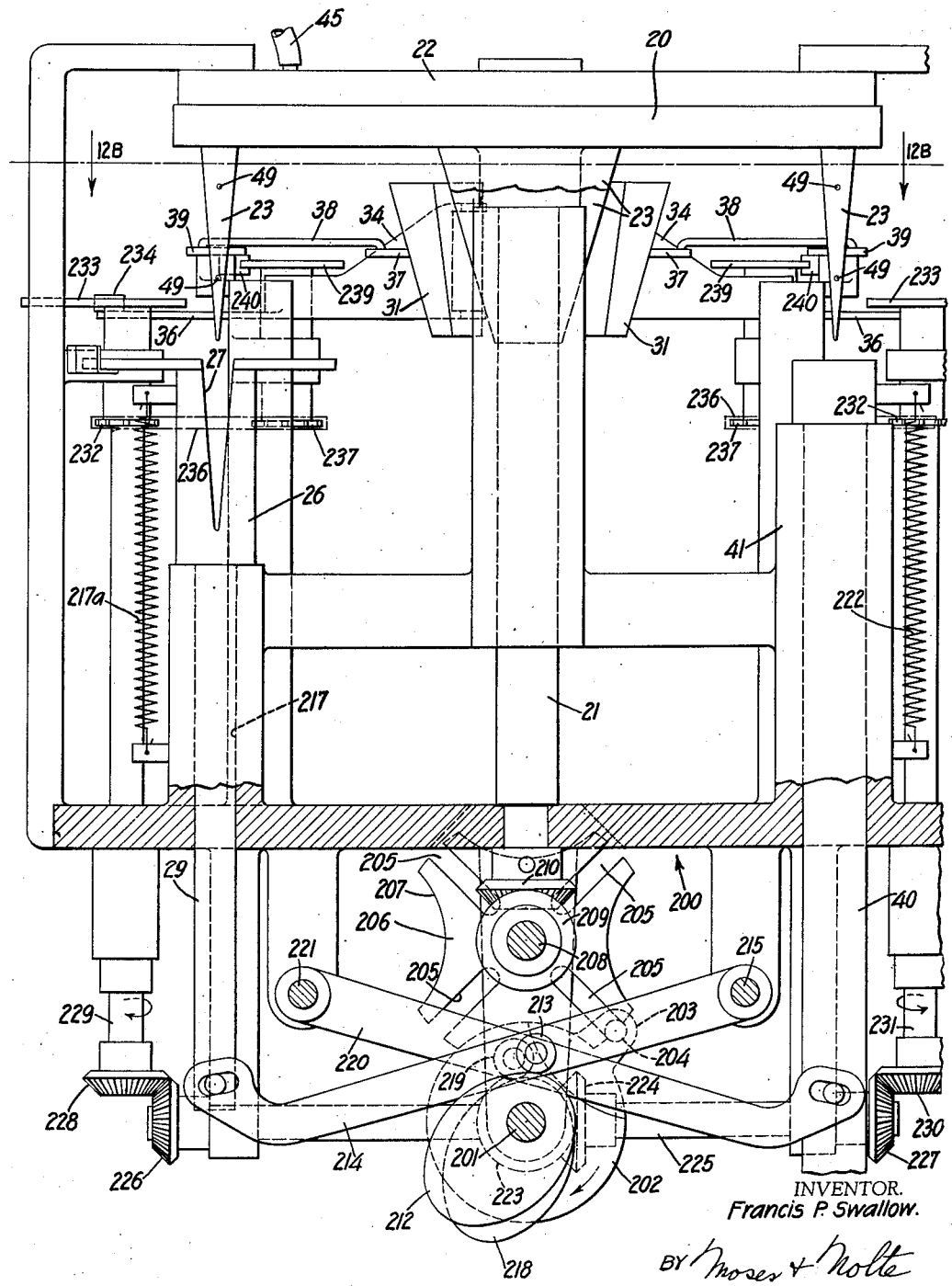

Fig. 10. is a view in elevation of a finished cup;

Fig. 10A is a view in elevation partly broken away and partly in section showing the frame structure and the organization of the parts of Figs. 1 to 8 inclusive;

Fig. 11 is a horizontal sectional view of another embodiment of the invention, the section being taken on the line 11—11 of Fig. 12, looking in the direction of the arrows;

Fig. 12. is a fragmentary view in elevation and partly in section illustrating the mechanism of Fig. 11;

Fig. 12A is a fragmentary view in elevation partly broken away showing the operating mechanism of the parts illustrated in Figs. 11 and 12.

Figure 13:
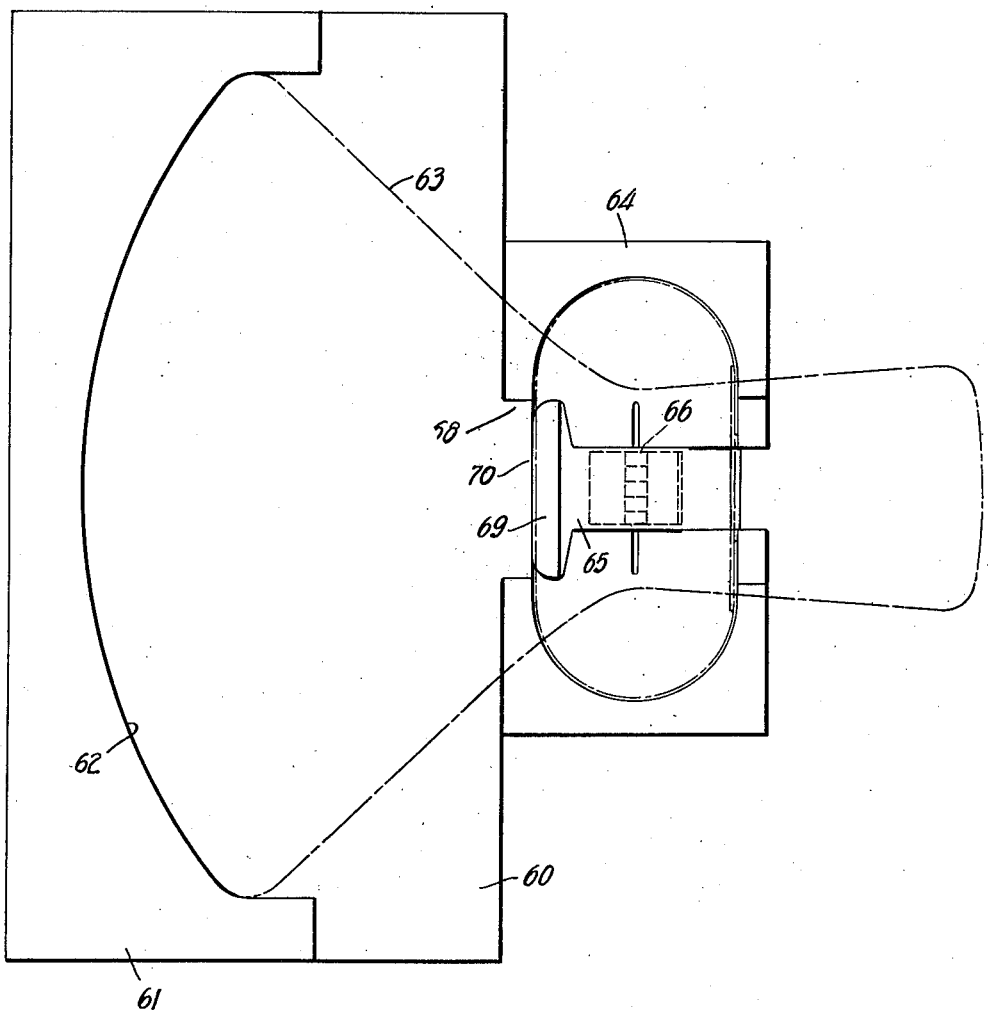
Figure 14:
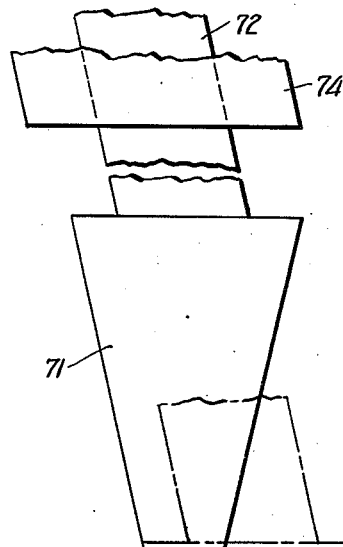
Figure 15:
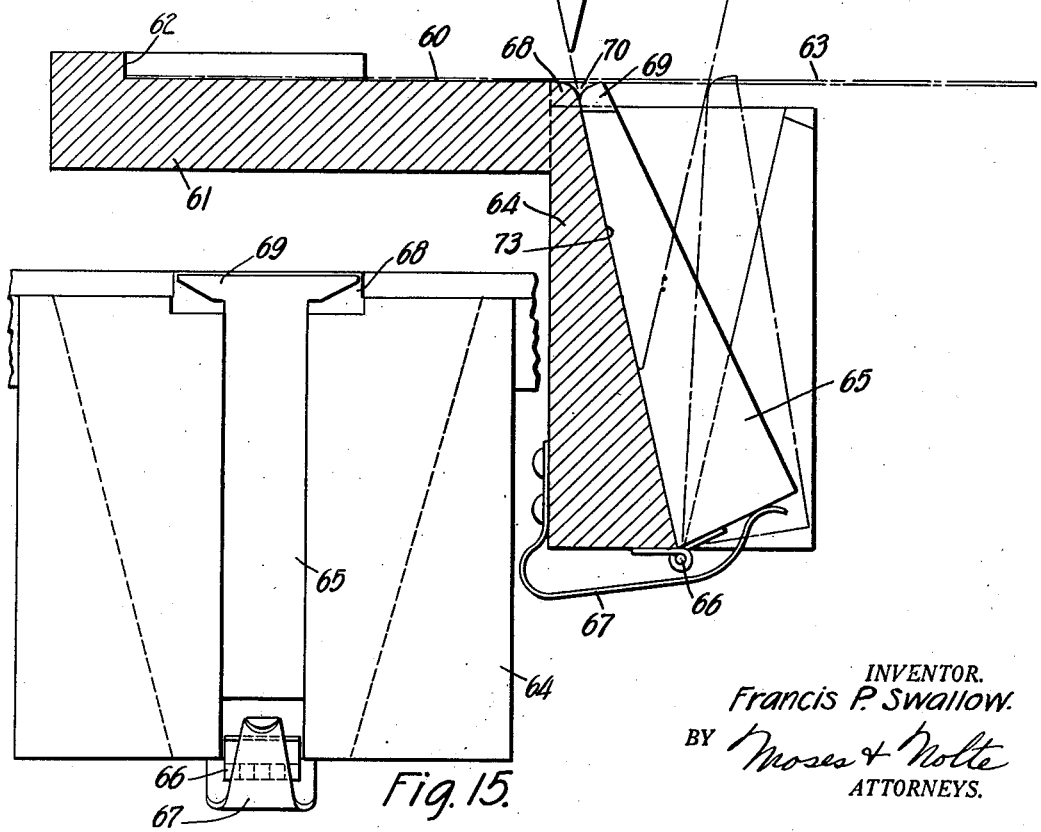

Fig. 12B is a fragmentary sectional view taken on the line 12B, 12B of Fig. 12A looking in the direction of the arrows;

Fig. 13 is a plan view of still another embodiment of the invention;

Fig. 14 is a view in sectional elevation of the embodiment of Fig. 13;

Fig. 15 is a view in front elevation of the embodiment of Figs. 13 and 14; and

Figure 16A:
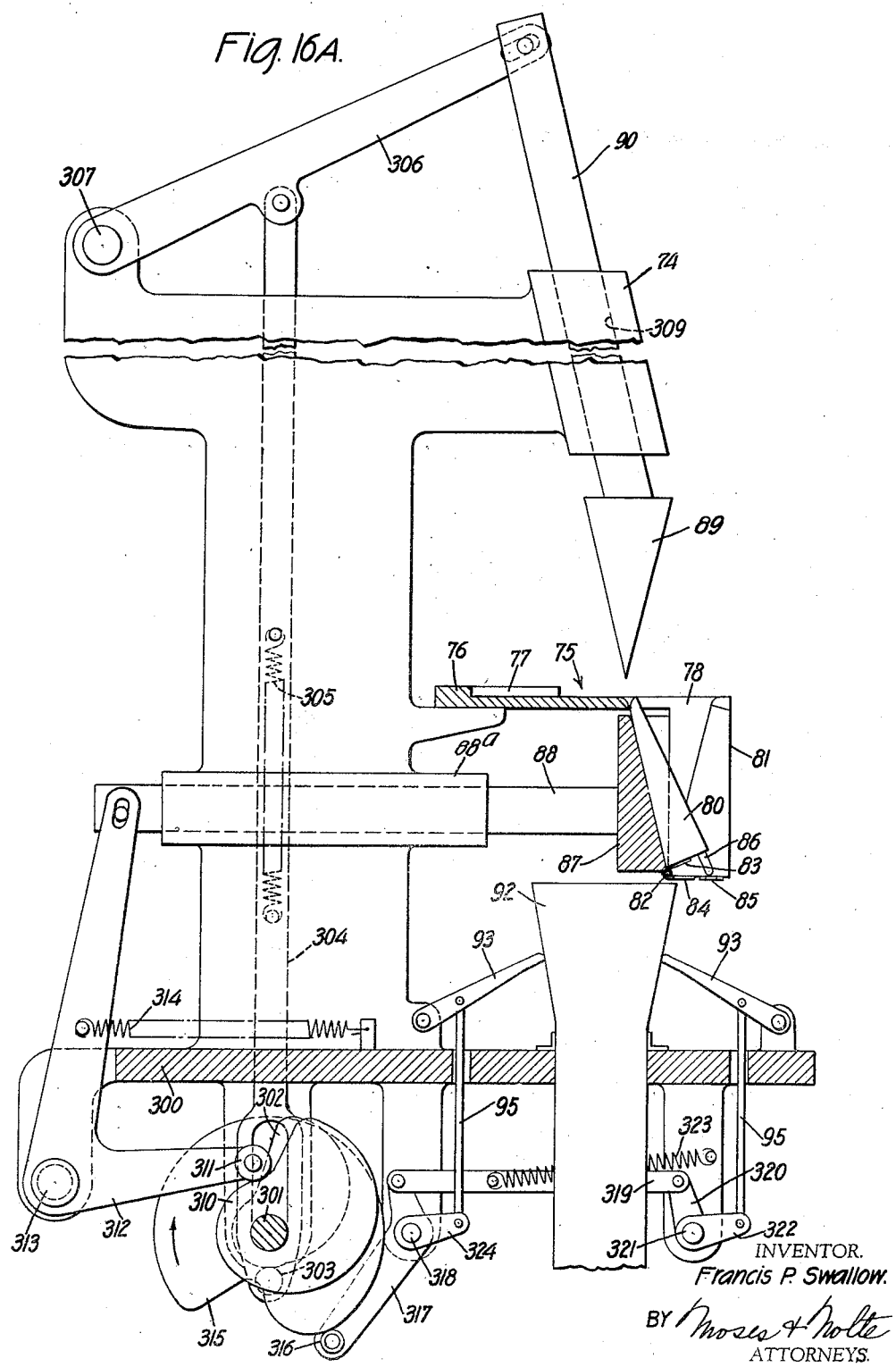

Fig. 16 is a fragmentary view in sectional elevation disclosing a further embodiment of the invention;

Fig. 16A is a fragmentary view in elevation partly broken away and partly in section showing the operating means of the parts in the forms of the invention illustrated in Figs. 13 to 16.

The blank 1, which may be of paper or other suitable material, comprises a pair of sector-like portions 2 and 3, these portions being integral with one another and connected through a narrow waist portion. The side margins of the sector-like portion 3 are provided with strips 4 of adhesive. The flat blank 1 with the adhesive strips 4 applied thereto is placed over the formers 5 and 6, being correctly positioned with reference thereto by a supporting table 7a and by engagement with fixed abutments 7. The former 6 is provided with arms 8 at its end which are fast upon shafts 9 and 10. The shafts 9 and 10 are pivotally mounted in ears 11 and 12 of the former 5. A spring 13 which surrounds the shaft 9 is connected at its opposite ends to the ear 11 and to a collar 14 fast on the shaft. This spring urges the formers 5 and 6 together. The formers 5 and 6 are thus caused normally to stand in juxtaposed relation with the former 6 received almost entirely within the former 5. Ears 5a and 6a provided respectively upon one of the ears 12 and one of the arms 8, engage a fixed stop 5b carried by a frame member 5c, to determine the normal positions of the formers 5 and 6. The formers 5 and 6 jointly form a wedge-shaped recess 15 at their upper ends. The former 5 has an opening 16 through one wall thereof, wide enough to permit passage therethrough of the former 6. Beyond the opening 16 the former 5 is provided with curved side recess portions 17 and with substantially straight guiding surfaces 18.

A male former 19 which tapers both in width and thickness, is located above the formers 5 and 6 and terminates at its lower end in a straight edge which moves in the plane of the junction of the formers 5 and 6. As the male former descends it first acts to insert the waist portion of the blank into the wedge-shaped opening 15, to crease the blank along a transverse line which is to form the bottom fold of the cup. This swings the opposite sectors 2 and 3 up to positions like those indicated at 2a and 3a in Fig. 3.

Figure 1:
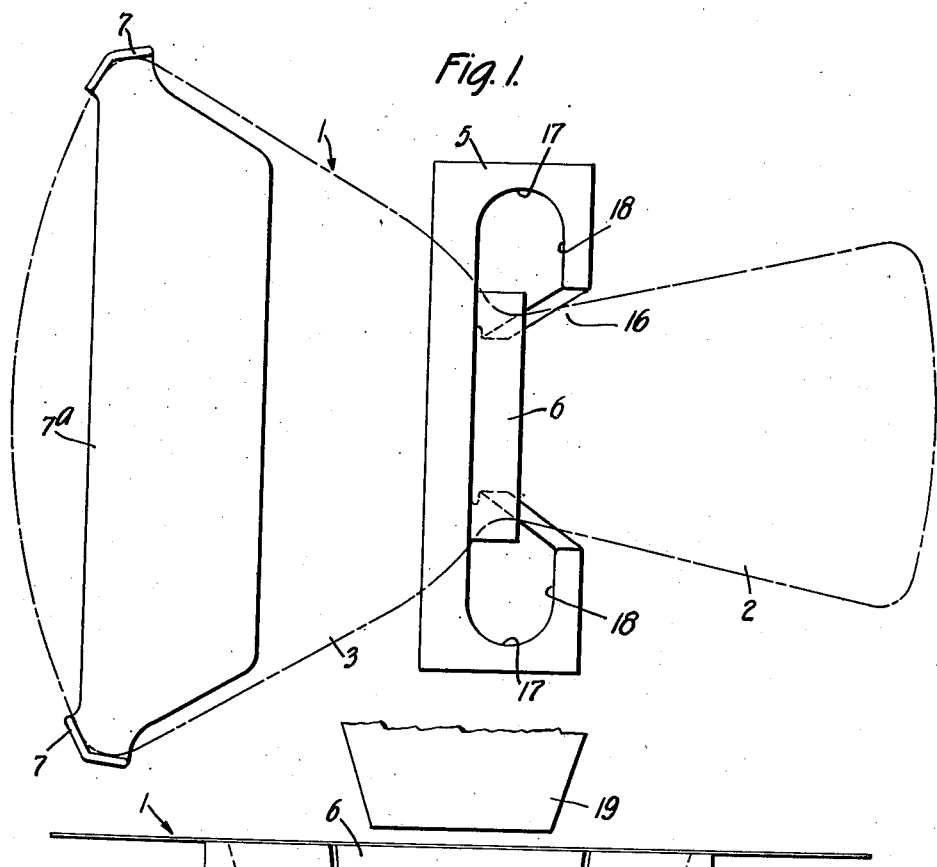
Fig. 1 is a diagrammatic view illustrating the original association of a blank with a portion of the forming mechanism employed in one embodiment of the invention.
Figure 2:
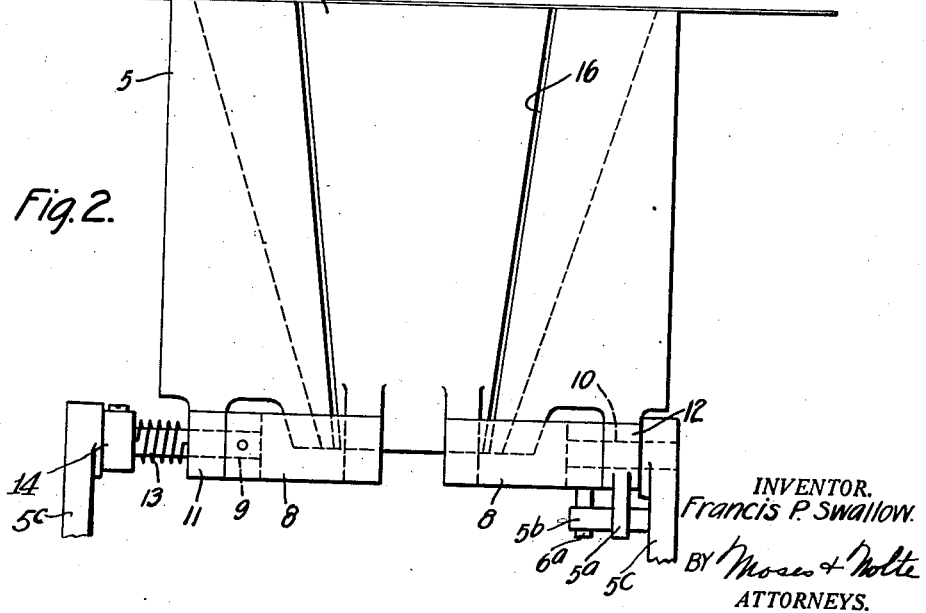
Fig. 2 is a fragmentary view in vertical elevation illustrating the same parts as Fig. 1 and further illustrating a fragment of the male former as it is about to engage the blank.
Figure 6:
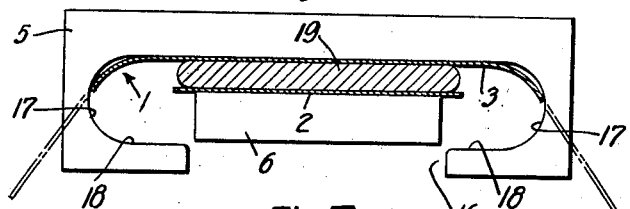
Figs. 6, 7, 8 are horizontal sectional views, Fig. 6 being a section taken on the line 6—6 of Fig. 4, looking in the direction of the arrows, and Figs. 7 and 8 being sectional views taken on the same line but at successively more advanced stages in the operation of the parts.
Figure 7:
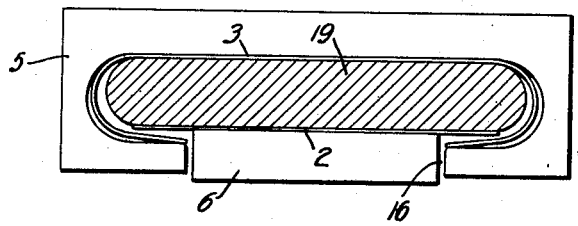
Figure 8:
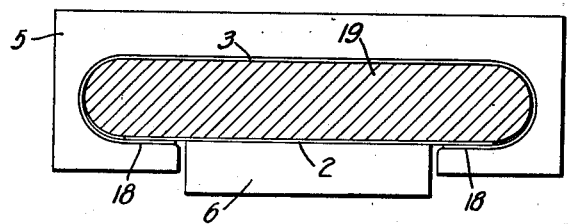

The continued descent of the former 19 thrusts the blank down between the formers 5 and 6 wedging the formers apart against the action of the spring 13. The effect of the continued descent of the former 19 will be best understood by comparison of Figs. 4, 5, 6, 7 and 8 with one another. The lower end of the blank is only a little wider than the lower edge of the male former 19 and it is not wide enough to extend out to the curved recesses 17 at the upper end of the former 5. As the blank descends with the former 19, however, the divergent side edges of the sector 3 gradually enter the curved recess portions of the former 5 so that the side margins of the wider sector are deflected progressively and turned inward until they overlie the side margins of the sector 2. The final position of the former 19 is illustrated in Fig 8, and in this position the former 19 cooperates with the surfaces 18 of the former 5 to press the overlapped margins of the sectors and form good adhesive unions between the overlapped margins. This completes the formation of the cup.

The male former 19 is then returned to its original position as illustrated in Fig. 3, taking the cup with it, and the finished cup is removed from the male former. The former 19 is provided with suction ducts 19a having side passages 19b. The passage 19a communicates with a source of suction through a passage 19c provided in the guide rod 19d. The rod 19d travels in a guide sleeve 19e. The male former may be one of a plurality of such members and may be carried by a turret to a second station for the removal of the cup from the former.

In Fig. 10A a frame 100 is shown upon which the described operating parts are mounted. A pair of brackets 5c, see Fig. 2 also, extend upward from the base of the frame 100. One of the brackets 5c carries the stop 5b which is disposed between the ears 5a and 6a for controlling the normal or at rest positions of the formers 5 and 6. The shafts 9 and 10 are journalled in the bracket 5c. An upright frame member 101 supports at its upper end a blank supporting plate 102. The supporting table 7a is supported at its ends by upright frame member 103 joined at their upper ends by a cross bar 103a. The table 7a and the supporting plate 102 stand in substantially the same plane with the upper ends of the formers 5 and 6 when the formers are in the closed position illustrated in Fig. 10A. The cross bar 103a has a horizontal extension 104 which provides a plunger guide 105 having a guide bore 106 therein for receiving the handle or rod 19d whereby the male former is operated. The bore 106 fits the rod 19d snugly except in the lower portion where a chamber 107 is provided. The chamber 107 communicates through a tube 108 with a source of suction. The rod 19d has a port 109 formed therein for communicating with the air passage 19c. When the parts are in elevated position the port 109 is exposed to the atmosphere so that atmospheric pressure is admitted to the interior of the former. When the former is moved downward far enough to carry the port 109 into the chamber 107 suction is applied to the former to cause the cup to be carried out of the female former with the male former. As soon as atmospheric air is again admitted to the interior of the male former, however, the cup may be removed, without difficulty, from the male former.

In the embodiment of the invention illustrated in Figs. 11 and 12, provision is made of a rotating turret or table 20 mounted upon a rotary shaft 21. A stationary valve plate 22 rests upon the table 20 and co-acts with the table to control air connections to a series of male formers 23 rigid with the table. The formers 23 are located at uniform intervals about the table, and the shaft 21 is turned step by step to bring the formers to successive stations and to cause them to remain at such stations for proper intervals to enable each blank to be operated upon at the station. Any desired number of formers 23 may be employed, but as illustrated herein, it is proposed to employ four formers spaced uniformly about the table.

The first station is the station illustrated at the left in Figs. 11 and 12. At this station provision is made of a table 24 having an opening 25 through the middle thereof. A former 26 supports the table and forms a downward extension of it. This former has an open sided wedge-shaped slot 27 provided in it, the opening through the table forming the mouth of the slot. A blank, having a transverse score line across the waist portion thereof, is placed upon the table with the table in the full line position of Fig. 12 being correctly located with the score line in line with the edge of the male former by stationary stops 28. The table 24 and the former 26 are then thrust upward by a thrust rod 29 which is guided in a sleeve 30. At this time one of the formers 23 is directly above the openings 25 and 27 so that the blank located upon the table is carried upward and folded around the former 23. The walls of the opening 27 are simply straight walls and do not serve to curl the marginal portions of the wider blank sector around the former. The blank is held to the former 23 by suction so that it remains upon the former 23 when the table 24 and the former 26 are retracted. When the table 25 is retracted to a position clear of the former 23, the turret revolves for a quarter of a revolution to carry the blank to the second station.

At this station the side margins of the wide sector of the blank are folded around the sides of the former 23 and are pressed into overlapping relation against the outer faces of the side margins of the narrow blank sector. This operation is performed by folding and pressing plates 31 which are rigid with arms 32. Each arm 32 is pivotally connected through a pin 33 with a rocker arm 34 fast on a shaft 35. The shaft 35 is oscillated at appropriate times in the cycle by a crank 36 fast upon it. Each arm 32 also has fast upon it an ear 37 which is connected through a link 38 with one arm of a rocking lever 39. The folding and pressing plates, and the operating parts therefor, are duplicates and they are operated simultaneously. The parts are first swung from the full line positions illustrated in Fig. 11 to the dot and dash line positions illustrated by 34ᵃ, 32ᵃ and 38ᵃ. This movement is accomplished simply by rocking the shaft 35 while the rocking lever 39 remains stationary. The shaft 35 then remains stationary while the rocking lever 39 is swung inward to carry the associated arm 32 and the folding and pressing plates, to the position indicated by 32ᵇ in Fig. 11. This operation completes the manufacture of the cup. The arms 32 are then retracted, being caused to travel in substantially the same path through which they advanced.

The turret is then rotated through another 90° to carry the former 23 to the third station. During this movement the cup is still held to the former by suction, but just before the cup reaches the third station the suction is cut off and the suction passages through the former are opened to the atmosphere, as will be explained more in detail farther on.

At the third station, provision is made of a hollow tube or chute 40 which is guided for vertical movement in a stationary sleeve 41. After the former 23 has come to rest at this station, the tube 40 is thrust upward to the dot and dash line position indicated at 40ᵃ. In this position a shoulder or lip 42 located near the mouth of the tube 40 passes above the upper edge of the cup on the former 23. The former 23 is provided with a slot 43, near its upper end to provide clearance for the shoulder portion of the tube and to prevent the crushing of the cup material between the tube and the former. As soon as the shoulder 42 has moved above the upper edge of the cup, the cup material springs out beneath the shoulder. The stack of nested cups within the tube 40 is displaced longitudinally of the tube by engagement with the cup on the former, to make room for the added cup. When the shoulder 42 has been located above the cup on the former, the tube 40 is retracted and the shoulder 42 serves to strip the cup from the former 23. When the tube 40 has moved clear of the former 23 the turret again advances.

The tube 40 is narrower than the normal width of the mouth of a cup and hence the progression of each cup along the tube is frictionally opposed. The result is that the cups emerge from the tube in a firmly nested stack.

It will be understood, of course, that the operating instrumentalities of the several stations operate simultaneously upon separate blanks, the pause in the feeding of the turret being of sufficient duration to permit all the described operations to be completed at each station. The operations are such that the time required at each station is substantially the same, and hence the operation at one station is not uselessly retarded because of an excessive time being required for the operation at another station.

The mechanism for controlling the suction comprises as stated, the valve plate 22 and the table 20. The plate 22 has a substantially semi-circular groove 44 extending near its periphery from the first station nearly to the third station. A suction conduit 45 communicates with such passage through a passage 46. The table 20 is provided with downwardly extending passages 47, each letting into the interior of one of the formers 23, and each adapted to register with the groove 44. A passage 48 in each former 23 forms a continuation of one of the passages 47 and is provided with lateral branches 49 and 50 which extend through the sides of the former 19. The passages 49 and 50, in turn, have transverse passages 51 and 52 branching from them, which extend through the opposite faces of the former 23. As a former nears the third station, the passage 47 communicating therewith moves clear of the groove 44, and as the former arrives at the third station the passage 47 moves into register with an opening 53 extending through the valve plate 22 and which places the interior of the former in communication with the atmosphere.

In this construction the former mechanism 5, 6 and associated parts may be utilized in place of the table 24 and the former 26, if desired.

Operating means for the instrumentalities described are disclosed in Figs. 12A and 12B. A frame 200 provides journals for a shaft 201 which operates and controls all of the operating parts. The shaft 201 has fast upon it a disc 202 forming one element of Geneva gearing for intermittently rotating the turret 20. The disc 202 includes an ear 203 which carries a drive pin 204. The drive pin 204 operates successively in slots 205 formed in a Geneva gear 206. Arcuate surfaces 207 on the periphery of the Geneva gear cooperate with the periphery of the disc 202 in a manner which is well understood. When the pin 204 enters one of the slots 205 it drives the Geneva gear 206 through a quarter of a revolution. The surface of the disc 202 then locks the Geneva gear 206 against rotation through three-quarters of a revolution of the disc 202. The Geneva gear 206 is fast upon a shaft 208 which through bevel gears 209 and 210 drives the vertical shaft 21 to rotate the turret 20 intermittently. The shaft 201 also carries a cam 212 for controlling the raising and lowering of the former 26 at the appropriate times in the cycle for carrying out the described operations. The cam 212 acts upon a cam follower 213 carried by a lever 214 which is rockingly mounted upon the frame 200 by means of a shaft 215. The lever 214 has pin-and-slot connections with the operating rod 29. The operating rod 29 is connected to the former 26 and extends vertically downward therefrom through a guide bore 217 formed in a portion of the frame 200. A spring 217a connected to the frame and to the former 26 pulls down on the former urging the former to its lowermost position and maintaining the follower 213 in engagement with the cam 212.

The shaft 201 also carries a cam 218 for causing the tube 40 to be raised and lowered at the appropriate times in the cycle. The cam 218 acts upon a follower 219 carried by a lever 220 which is rockingly mounted upon the machine frame by means of a shaft 221. The lever 220 is connected to the tube 40 through a pin-and-slot connection. A spring 222 connected to the upper end of the tube 40 and to the machine frame urges the tube downward and maintains the follower 219 in engagement with the cam 218.

The shaft 201 also serves to drive and control the arms 32 and the plates 31 carried thereby. The shaft 201 carries a bevel gear 223 which drives a bevel gear 224 fast on a horizontal shaft 225. The shaft 225 carries bevel gears 226 and 227 at its opposite ends the former meshing with a bevel gear 228 fast on a vertical shaft 229 and the latter meshing with a bevel gear 230 fast on a vertical shaft 231. The vertical shafts 229 and 231 are driven in opposite directions by the driving train described. Each of them operates one of the arms 32 through a train of mechanism. These trains are substantially the same, being mirror images of one another and hence a description of one will suffice for both. The shaft 229 carries at the upper end thereof a sprocket 232 and a cam 233. The cam 233 acts upon a follower 234 carried by the crank 36 which is fast upon the shaft 35. As already pointed out the shaft 35 also has fast upon it a rocking arm 34 which pivotally supports the arm 32. A spring 235 connected to the arm 34 and to a frame member 236 maintains the follower 234 in engagement with the cam 233. The contour of the cam 233 is such that the arm 34 is operated at the appropriate times in the cycle to carry out the operations already described.

The sprocket 232 drives a chain 236 and the chain in turn drives a sprocket 237 fast on a vertical shaft 238. The shaft 238 has fast upon it a cam 239. The cam 239 acts upon a cam follower 240 which is carried by a rocking lever 39. A spring 241 connected to the rocking lever and to the frame member 236 serves to maintain the follower 240 in engagement with the cam 239. As already pointed out the rocking lever 39 is connected through the link 38 with the ear 37 on the arm 32. The contour of the cam 239 is such that the rocking lever 39 is operated at the appropriate times in the cycle to carry out the described operations.

As already pointed out the rotation of the turret relative to the valve plate 22 controls the communication of the male former with the source of suction.

The embodiment of Figs. 13 to 15, is generally similar to the embodiment of Figs. 1 to 8. It differs principally from the embodiment of Figs. 1 to 8, in that the female former is stationarily mounted and the male former moves parallel to the inner wall of the female former. The work supporting and positioning table in this form includes a continuous edge gauge for positioning the work and such table is secured directly and fixedly to the female former.

A blank supporting table 60 has a raised portion 61 which provides an arcuate shoulder 62 for continuously engaging the curved edge of the wide sector of a blank 63. A female former 64 is fixedly secured to the table at one side thereof, and a cooperative former 65 is pivoted to the former 64 by means of a hinge 66. A leaf spring 67 fixed upon the former 64 engages the former 65 and urges it toward the position illustrated in Fig. 14. The former 64 is located generally a little below the blank supporting plane of the table 61, and is provided with a lip 68 which extends upward and terminates flush with the blank supporting plane of the table. The former 65 is also provided with a lip 69 at the upper extremity thereof, which stands flush with the lip 68. These lips provide between them a funnel shaped mouth 70 for receiving the blank. A male former 71 carried by a plunger rod 72 is located above the formers 64 and 65 and is guided for movement in parallelism with the flat inner face 73 of the former 64 by means of an inclined sleeve 74. The adjacent faces of the formers 71 and 64 are parallel and clear one another only by the thickness of the blank material.

Figure 9:
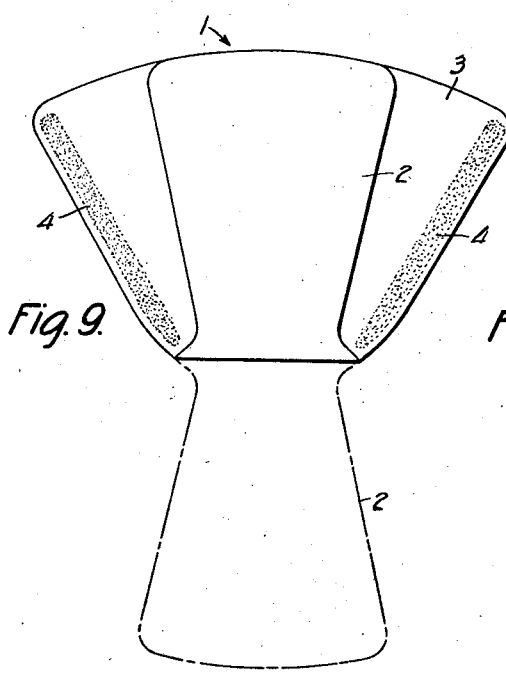
Fig. 9 is a plan view of one of the blanks operated upon, the blank being illustrated as in substantially the condition of the dot and dash blank of Fig. 3.

The operations performed by the formers 64, 65 and 71 upon the blank are the same as those described with reference to the formers 5, 6 and 19 of Figs. 1 to 8. In this instance, however, one surface of the former 71 moves continuously in parallelism with and in close proximity to the surface 73 of the former 64. The former 64 also is provided with a wider mouth than the former 5 of Figs. 1 to 8. This former is adapted to operate upon a blank in which the wide sector is wider and the narrow sector is narrower than the corresponding parts of the blank 1 of Figs. 9 and 10.

The embodiment of Fig. 16 resembles most nearly the embodiment of Figs. 13–15. It differs from the embodiment of Figs. 13–15, however, in that provision is made for leaving the formed cup in the female former and for discharging it laterally and downwardly from the female former simultaneously with the retraction of the male former. To this end the female former is modified, being made in separable sections.

As illustratively disclosed a table 75 is provided with a raised portion 76 which forms a continuous gauging surface 77 for positioning a blank. The table is provided with an ovate opening 78 which is of the same shape as the mouth of the former 64. The margin of the table bordering the opening forms a rim or ring which is continuous save at one side where an opening is provided to accommodate a lip 79 of a pivoted former member 80. The female former comprises fixed sections 81 which are secured to the table and which form a continuation of the former mouth 78. The former sections 81 are spaced from one another just far enough to receive the narrow portion of the former 80, and provision is made of a hinge 82 having the leaves 83 and 84 thereof secured respectively to the former 80 and to the former sections 81. A spring 85, secured to one of the former sections 81, engages a stud 86 on the former section 80 and urges the former section counter-clockwise toward a position like that in which former section 65 is shown in Fig. 14. The former sections 80 and 81 jointly form only one-half of the female former below the rim, and terminate in the longitudinally vertical central plane of the rim so that the former sections 81 have no over-hanging or reentrant portions which would tend to obstruct lateral removal of a formed cup from them. A complementary former section 87 located below and clear of the table 75 is fixed upon a reciprocating rod 88 which is guided for rectilinear movement in a supporting sleeve 89. The rod 88 is reciprocable to carry the former member 87 back and forth between the full line position in which the former 87 is shown in Fig. 16 and the dot and dash line position indicated at 87ª in said figure.

A male former 89 is provided, this former being of the same shape as the former 71 of Fig. 14. The former 89 is carried by a stem or plunger rod 90 which extends parallel to the face of the male former which engages in the base of the cavity of the former section 87. The former 89 is reciprocated in the direction of the length of the stem 90 between the full line position illustrated in Fig. 16 and the dot and dash line position indicated at 89ª in said figure.

In the operation of this embodiment of the invention the cup forming operations are the same as in the operation of the embodiment of Figs. 13-15. A blank is first positioned upon the table 75 and the former 89 is driven downward to cause the tongue 79, in cooperation with the table rim to fold the blank and grip it to the opposite faces of the former 89. As the blank is driven downward by the former the side margins of the wide sector are curled inward and folded around the side margins of the narrow sector of the blank. The blank is driven through and clear of the rim or mouth formed by the table so that the finished cup 91 occupies the position in which it is shown in Fig. 16.

As soon as the cup has been fully formed the male former starts upward and the former section 87 starts moving toward the left. As the male former moves upward the former section 80, influenced by the springs 85, swings toward the left, displacing the formed cup bodily toward the left. The retraction or leftward movement of the former section 87 is sufficiently rapid to avoid any obstruction to bodily lateral displacement of the cup produced by the swinging movement of the former section 80. The cup is accordingly displaced beneath the table 75 and is caused to drop between the former sections 81 and 87 into the chute 92. The former section 87 is retracted far enough to leave a gap between the lower edges of the former sections of greater width than the normal width of the mouth of a cup and the mouth of the chute 92 is large enough to extend completely across this gap so that each cup, as it falls from between the former sections, is received by the chute and guided downward. The chute 92 converges to form a lower portion which is narrower than the normal width of a cup mouth so that the progression of the cups along this portion of the chute is frictionally opposed. Each cup is brought to rest in a position substantially like that illustrated at 91ª and presser arms 93, mounted on pivots 94 and operated by rods 95, are oscillated at appropriate times to press the last received cup into the cup stack contained in the narrow portion of the chute and to cause said stack to be moved a step along the chute. This presser arm and chute construction are disclosed and claimed in my pending application Serial No. 710,944 filed Feb. 12, 1934 for Method and apparatus for manufacture of drinking cups.

As soon as a suitable interval has been provided to permit a formed cup to drop from between the former sections 87 and 81 the former section 87 is restored to the full line position illustrated in Fig. 16 so that the complete female former is again ready to receive and form a fresh blank into a cup by the time that the male former is ready to be again driven downward to insert a fresh blank.

In Fig. 16A disclosure is made of the operating mechanism of the parts illustrated in Fig. 16.

A frame 300 provides journals for a shaft 301 which is constantly driven and which operates and controls all of the operating parts.

The shaft 301 carries a cam 302 for operating the male former 89. The cam 302 acts upon a follower 303 mounted on a connecting rod 304. An enlarged portion of the connecting rod 304 embraces the shaft 301 and serves to guide the connecting rod. A spring 305 urges the connecting rod 304 upward and maintains the follower 303 in engagement with the cam 302. The upper end of the connecting rod 304 is pivotally connected to a rocking arm 306 which is pivoted on a stud 307, the latter being mounted on the frame 300. The rocking arm 306 has a pin-and-slot connection with the plunger rod 90. The frame 300 carries the guide sleeve 74 having a bore 309 therein for guiding the plunger rod 90. The bore 309 extends parallel to the flat inner face of the former section 87.

The shaft 301 also carries a cam 310 for operating the former section 87 in the manner described. The cam 310 acts upon a follower 311 carried by a bell crank 312. The bell crank 312 is mounted upon a stud 313 carried by the frame 300 and is adapted to rock to and fro. A spring 314 connected to the bell crank 312 and to the frame 300 urges the bell crank in a clockwise direction and maintains the follower 311 in engagement with the cam 310. The upper end of the bell crank has a pin-and-slot connection with the rod 88 which carries the former section 87. The guiding sleeve 88ª in which the rod 88 travels is a part of the frame 300.

The shaft 301 also carries a cam 315 for operating the presser arms 93. A cam 315 acts upon a follower 316 which is carried by a bell crank 317. The bell crank 317 is fast upon a rock shaft 318 which is journalled in a portion of the frame 300. The upper end of the bell crank 317 is connected through a link 319 to a crank 320 fast on a shaft 321. The shaft 321 also has fast upon it a crank 322 which is connected through a link 95 to one of the presser arms 93. A spring 323 connected to the link 319 and to the frame serves to maintain the follower 316 in engagement with the cam 315.

The rock shaft 318 also has fast upon it a crank 324 which is connected through a link 95 to the other presser arm 93.

The contours of the several cams referred to are such that the parts are caused to perform their prescribed functions at the appropriate times in the cycle.

The table 75 is rigidly mounted upon the frame 300. The former section 81 may be integral with the table 75.

While I have illustrated and described in detail the preferred embodiment of the invention, it is to be understood that changes may be made therein. I do not, therefore, desire to limit myself to the specific construction illustrated, but intend to cover my invention broadly in whatever form its principles may be utilized.

I claim:

1. In a machine for making sanitary drinking cups from blanks of sheet material, each composed of a pair of oppositely extending sector-like portions, in combination, a concave former, the cavity of the former being wedge-shaped and having a flat base and rounded side recesses, and the former being open at one end and one side, a second former pivotally connected to the first, spring means urging the second former toward the first to cause the inner face of the second former to lie normally in juxtaposed relation to the flat base of the first former, and a wedge-shaped male former insertable between the first and second formers to insert a blank and fold it substantially into finished cup form.

2. In a machine for making sanitary drinking cups from blanks of sheet material, each composed of a pair of oppositely extending sector-like portions, in combination, a pair of cooperative complementary formers mounted for relative pivotal movements, spring means urging opposed faces of the formers toward one another, and a wedge-shaped male former insertable between the two first-mentioned formers to force them apart to insert a blank between them, and to overlap margins of the blank sectors, the complementary formers then jointly forming a wedge-shaped cavity to fit the male former.

3. In a machine for making sanitary drinking cups from blanks of sheet material, each composed of a pair of oppositely extending sector-like portions, in combination, a pair of former members pivotally connected and providing surfaces for engaging the outer faces of the respective blank sectors, said former members adapted to jointly form a wedge-shaped cavity and a former insertable between said surfaces for pressing a blank between and against them.

4. In a machine for making tapering sanitary drinking cups from blanks of sheet material, each composed of a pair of oppositely extending sector-like portions, in combination, a female former, the cavity of said former being wedge-shaped and having smoothly-rounded side recesses, and a complementary male former insertable through the larger end of the female former to insert a blank and to cause the side margins of the blank to be progressively curled and turned inward.

5. In a machine for making tapering sanitary drinking cups, in combination, a pair of formers normally disposed in juxtaposed relation and forming a work receiving and folding notch, means for supporting a blank across said notch, and a wedge-shaped male former, said male former and said pair of formers being relatively longitudinally movable to insert the male former between the formers of said pair to fold the blank and thrust it between said formers.

6. In a machine for making tapering sanitary drinking cups, in combination, a pair of formers normally disposed in juxtaposed relation and forming a work receiving and folding notch, means for supporting a blank across said notch, and a wedge-shaped male former, said male former and said pair of formers being relatively longitudinally movable to insert the male former between the formers of said pair to fold the blank and thrust it between said formers, one of the formers of said pair being shaped to curl side marginal portions of the blank inward as the blank is thrust in.

7. In a machine for making sanitary drinking cups, in combination, a pair of formers normally disposed in juxtaposed relation and forming a work receiving and folding notch, means for supporting a blank across said notch, and a wedge-shaped male former, said male former and said pair of formers being relatively longitudinally movable to insert the male former between the formers of said pair to fold the blank and thrust it between said formers, one of the formers of said pair being shaped to curl side marginal portions of the blank inward as the blank is thrust in, and the other being displacable by the male former to accommodate the insertion of the male former and the blank.

8. In a machine for making sanitary drinking cups, in combination, a pair of formers normally disposed in juxtaposed relation and forming a work-receiving and folding notch, means for supporting a blank across said notch, and a wedge-shaped male former, said male former and said pair of formers being relatively longitudinally movable to insert the male former between the formers of said pair to fold the blank and thrust it between said formers, one of the formers of said pair being shaped to curl side marginal portions of the blank inward as the blank is thrust in, and the other being displacable by the male former to accommodate the insertion of the male former and the blank, the formers of said pair jointly forming a cavity which substantially fits the male former in the final position thereof.

9. In a machine for making sanitary drinking cups from blanks of sheet material, each composed of a pair of oppositely extending sector-like portions, in combination, a female former the cavity of said former being wedge-shaped and having smoothly-rounded side recesses, and a complementary male former insertable through the larger end of the female former to insert a blank and to cause the side margins of the blank to be progressively curled and turned inward, a folding member located adjacent the mouth of the female former and cooperative therewith to form a folding notch, and spring means urging said member across the mouth of the female former but yieldable in response to pressure exerted by the male former, whereby the folding member is caused to slidingly and yielding engage the blank and grip it to male former substantially throughout the insertion of the blank.

10. In a machine for making sanitary drinking cups composed of oppositely extending relatively wide and narrow sector-like portions, in combination, a female former having an oval shaped mouth portion for curling inward side marginal portions of the wider blank sector, a wedge-shaped male former insertable through said mouth, and means for holding the narrower blank sector flat against the wedge-shaped male former and within the curling path of the marginal portions of the wider sector, said female former having an internal surface cooperative with the male former in the final position of the latter to press the margins of the wide and narrow sectors against one another.

11. In a machine for making sanitary drinking cups from blanks composed of oppositely extending wide and narrow sectors, in combination, male and female formers cooperative at a first station to fold a blank about an end of the male former, means for causing the blank to be carried by the male former to a second station, means at the second station for folding side marginal portions of the wide sector about the male former and overlapping the side margins thereof upon the side margins of the narrow sector, and means for stripping the cup from the male former at a third station.

12. In a machine for making sanitary drinking cups, in combination, male and female formers cooperative at a first station to fold a blank about the male former, means for relatively moving the formers in one direction to form a blank and in the reverse direction to separate the formers, means for then moving the male former away from the female former to a second station, and means at the second station to strip the finished cup from the male former.

13. In a machine for making sanitary drinking cups, in combination, means for completely forming and scoring a blank into finished cup form comprising male and female formers, and means for causing the cup blank to be withdrawn from the female former with the male former, and to be added by the male former to a stack of cups.

14. In a machine for making sanitary drinking cups, in combination, a male former, means cooperative with said former to form a cup thereon, means for withdrawing the male former from the cooperating means with the cup upon it, and a mechanism adapted to receive the male former with the cup upon it and to strip the cup from the former.

15. In a machine for making sanitary drinking cups, in combination, a turret, a plurality of male formers carried by the turret, a female former at a forming station cooperative by a relative thrust with each successive male former to form a complete cup at a single operation, and mechanism at a discharge station also cooperative with the successive male formers to strip the finished cups and stack them.

16. In a machine for making sanitary drinking cups, in combination, a plurality of male formers, a common rotary support therefor, a female former at a forming station, a stripping device at a discharge station, means for rotating the male former support step by step to bring the male formers one after another to each of the stations, and means for relatively moving a male former and the female former at the forming station to completely form a cup by a single thrust and for simultaneously relatively moving a male former and the stripping device at the discharge station to effect a stripping operation.

17. In a machine for making sanitary drinking cups, in combination, a plurality of male formers, a common rotary support therefor, a female former at a forming station, a stripping device at a discharge station, means for rotating the male former support step by step to bring the male formers one after another to each of the stations, and operating means for causing the female former to be thrust toward the male former to completely form a cup at a single operation and means for causing a stripping operation to be simultaneously performed at the discharge station.

18. In a machine for making sanitary drinking cups, in combination, a female former having a substantially oval shaped mouth, a wedge-shaped male former, means guiding the male former for movement in parallelism with one of the faces thereof, and means normally cooperating with a mouth portion of the female former to provide a blank forming notch in the path of movement of the leading edge of the male former.

19. In a machine for making sanitary drinking cups, in combination, a wedge-shaped male former, a female former adapted to completely enclose and fit the male former, means guiding the male former for movement in parallelism with one of the faces thereof, and means normally cooperating with a mouth portion of the female former to provide a blank folding notch in the path of movement of the leading edge of the male former.

20. The method of making sanitary drinking cups which comprises providing a blank composed of oppositely extending wide and narrow sector like portions, folding and advancing the waist portion of the blank to draw the sector portions after it, simultaneously curling side marginal portions of the wide sector around the side edges of the narrow sector, and pressing the side marginal portions of the wide sector against the outer face of the side marginal portions of the narrow sector.

21. In a machine for making sanitary drinking cups, in combination, a longitudinally reciprocable male former, an open sided female former means for cooperation therewith to fold a blank into cup form, and means for ejecting the formed cup laterally from the female former means during the retracting stroke of the male former.

22. In a machine for making sanitary drinking cups, in combination, a longitudinally reciprocable male former, and a sectional female former comprising means constituting a substantially complete former rim or mouth, and means forming a fixed open-sided continuation of a portion of said rim, cooperative with the male former to press overlapped margins of a blank together.

23. In a machine for making sanitary drinking cups, in combination, an ovate forming rim, a wedge-shaped male former longitudinally reciprocable through said rim, means for driving the male former into the rim and causing it to drive a cup blank completely through and clear of the rim, and open-sided former means constituting a continuation of a portion of said rim for cooperating with the male former in the final position thereof to press overlapped margins of a blank together.

24. In a machine for making sanitary drinking cups, in combination, a longitudinally reciprocable male former, and a sectional female former comprising means constituting a substantially complete former rim or mouth, and means constituting a fixed open-sided continuation of a portion of said rim for cooperating with the male former to press overlapped margins of a blank together, and a former section located below the rim and complementary to said open-sided continuation of the rim, said former section being retractable laterally during longitudinal retraction of the male former to permit the formed cup to be displaced laterally and discharged downwardly from the female former.

25. In a machine for making sanitary drinking cups, in combination, a longitudinally reciprocable male former, and a sectional female former comprising means constituting a substantially complete former rim or mouth, and means constituting a fixed open-sided continuation of a portion of said rim for cooperating with the male former to press overlapped margins of a blank together, and a former section located below the rim and complementary to said open-sided continuation of the rim, said former section being retractable laterally during longitudinal retraction of the male former to permit the formed cup to be displaced laterally and discharged downwardly from the female former, and means for receiving and stacking the formed cups as they are discharged from the female former.

FRANCIS P. SWALLOW.